(12) United States Patent
Schroth et al.

(10) Patent No.: US 7,073,379 B2
(45) Date of Patent: Jul. 11, 2006

(54) ARRANGEMENT AND PROCEDURE FOR THE MEASURING OF LIQUID LEVEL

(75) Inventors: Herbert Schroth, Schopfheim (DE); Rolf Deserno, Maulburg (DE)

(73) Assignee: Endreas & Hauser GmbH & Co. KG, Maulburg (DE)

( * ) Notice: Subject to any disclaimer, the term of this patent is extended or adjusted under 35 U.S.C. 154(b) by 0 days.

(21) Appl. No.: 10/858,058

(22) Filed: Jun. 2, 2004

(65) Prior Publication Data

US 2005/0044952 A1    Mar. 3, 2005

(30) Foreign Application Priority Data

Jun. 3, 2003    (DE)    ................. 103 25 267

(51) Int. Cl.
*G01F 23/284*    (2006.01)
*G01S 15/00*    (2006.01)

(52) U.S. Cl. .................. 73/290 V; 367/99; 367/908

(58) Field of Classification Search ............ 73/290 V; 367/99, 908; 340/621
See application file for complete search history.

(56) References Cited

U.S. PATENT DOCUMENTS

| 4,114,441 | A | * | 9/1978 | Magri ....................... 73/290 V |
| 4,455,870 | A | * | 6/1984 | Jorritsma ..................... 73/223 |
| 4,972,386 | A | * | 11/1990 | Lau .............................. 367/99 |
| 5,131,271 | A | * | 7/1992 | Haynes et al. ............ 73/290 V |
| 5,987,994 | A | * | 11/1999 | Maltby et al. ................ 73/646 |
| 2003/0024306 | A1 | * | 2/2003 | Benz ........................ 73/290 V |
| 2004/0074295 | A1 | * | 4/2004 | Michalski et al. ........ 73/290 R |

* cited by examiner

*Primary Examiner*—Hezron Williams
*Assistant Examiner*—Ryan Christensen
(74) *Attorney, Agent, or Firm*—Bacon & Thomas (57) ABSTRACT

An arrangement for fill level measurement is provided, with which accurate fill level measurement on a continuing basis is possible, including a container (3) containing a fill substance (1) whose fill level is to be measured, a fill level measuring device (5) arranged at the container (3) and operating according to the travel time principle, an apparatus (11, 13) for registering a filling and/or emptying of the container (3), an auxiliary unit (19), which by means of the filling and/or emptying registered by the apparatus (11, 13), determines an instantaneous change in fill level ($V_L$) or an instantaneous change in material flow rate, and makes such available to the fill level measuring device (5) for determining the fill level (L) to be measured.

5 Claims, 4 Drawing Sheets

ARRANGEMENT AND PROCEDURE FOR THE MEASURING OF LIQUID LEVEL

FIELD OF THE INVENTION

The invention concerns an arrangement for fill level measurement and a method for fill level measurement. In fill level measurement, the fill level of a fill substance in a container is registered.

BACKGROUND OF THE INVENTION

Fill level measurements are applied in a wide variety of industries, e.g. in the manufacturing industry, in the chemical industry, and in the foods industry. The fill level measurements are used e.g. for control and/or regulation of manufacturing and/or materials treatment processes.

In fill level measurement technology, three types of fill level measurement are presently known. These three types differ according to the type of parameter which is recorded in the measurement. The different parameters can be divided into integral, differential, and discrete parameters.

An integral parameter is e.g. the pressure difference between a bottom and a top of the container. The pressure difference changes depending on the fill level. Another integral parameter is a fill-level dependent capacitance between an electrode protruding into the container and the container.

If an integral parameter is used for fill level measurement, then, however, the danger exists that material parameters, which enter into the fill level determination, e.g. a density of the liquid when the fill level is established using a pressure difference measurement, or a dielectric constant of the fill substance-when the fill level is determined using a capacitance measurement, either are not precisely known in advance, or can fluctuate.

A differential parameter, which can be used for determining fill level, is e.g. a material flow rate into the container and/or out of the container. This can be registered e.g. using flow rate measuring devices. With flow rate measuring devices, changes in fill level can be registered more precisely than with fill level measuring devices, given that in this instance, an occurring measuring error relates only to the flowing amount of material and not to the entire amount of the fill substance.

If the fill level is known at a starting point, then a fill level at a later point can be determined from the material flow rate by integration.

However, in the case of integration, systematic measuring errors can add up, such that in the long run, a growing uncertainty of the measurements will arise.

Additionally, the possibility exists to determine fill level using discrete parameters. The most significant discrete parameter for a continuous fill level measurement is the position of an upper surface of the fill substance. This position can be determined e.g. using fill level measuring devices operating according to the travel time principle. Signals, e.g. electromagnetic signals or ultrasonic signals, are transmitted to the surface, and their echo signals are received back. A travel time to the surface and back is determined, and from that, the position of the surface is determined.

Presently a wide variety of such methods are in use, e.g. the Pulse-Radar method, the Frequency Modulated Continuous Wave (FMCW) method, and Time-Domain-Reflectometry.

In the Pulse-Radar method e.g. short send-pulses, normally microwave pulses, are periodically transmitted by means of an antenna to the surface of a fill substance, and the echo signals reflected on the surface are received back after a separation-dependent travel time. An echo function representing the echo amplitudes as a function of the travel time is established. Each value of this echo function corresponds to the amplitude of an echo reflected at a specific separation from the antenna.

From the echo function, a usable echo is determined, which corresponds to the reflection of a send-pulse on the upper surface of the fill substance. It is normally assumed that the usable echo has a greater amplitude than the remaining echoes. In the case of a fixed propagation velocity of the send-pulses, the separation between the upper surface of the fill substance and the antenna is immediately obtainable from the travel time of the usable echo.

Normally, a received raw signal is not used for evaluation, rather, from the raw signal, an echo-curve is derived, which is then evaluated. In the Pulse-Radar method, the echo-curve is e.g. a hull, or envelope, curve derived from the raw signal. The hull curve is established by rectifying and filtering the raw signal. In the Frequency Modulated Continuous Wave method, the echo-curve is e.g. a frequency spectrum derived from the raw signal. For the exact determination of a travel time of the usable echo, first a maximum of the echo curve is determined.

Fill level measurement according to the travel time principle depends only on the constant propagation velocity of the signals, and thus supplies very accurate results.

However, in fill level measurement according to the travel time principle, difficulties exist when, for example, multiple echoes are present due to fixtures in the container or due to multiple reflections of the signals.

Multiple reflections occur e.g. when a send-pulse is reflected back and forth repeatedly between the upper surface of the fill substance and a lid of the container.

The results of the measurements are thus very accurate as long as the correct echo is recognized. However, if the correct echo is not recognized, free of doubt, then a very great uncertainty of the measurements will arise. Plausible assumptions concerning the maximum filling- and emptying velocities or concerning the relative strengths of the signals can in fact, in some cases, ensure the selection of the correct echo; however, due to the wide variety of various measuring situations, all possible cases cannot be covered therewith.

SUMMARY OF THE INVENTION

An object of the invention is to provide an arrangement and a method for fill level measurement enabling accurate fill level measurement on a continuing basis.

For this purpose, the invention resides in an arrangement for fill level measurement having
  a container containing a fill substance, the fill level of which is to be measured,
  a fill level measuring device arranged at the container, operating according to the travel time principle,
  an apparatus for registering a filling and/or emptying of the container,
  an auxiliary unit, which by means of the filling and/or emptying registered by the apparatus, determines an instantaneous change in fill level or an instantaneous material flow rate, and makes such available to the fill level measuring device for determining the fill level to be measured.

In accordance with one embodiment, the apparatus for registering the filling and/or emptying includes at least one flow rate measuring device, a filling and/or emptying pump, or a conveyor.

In accordance with one embodiment, the fill level measuring device has at least one signal input, by way of which external information concerning the instantaneous change in fill level or the instantaneous material flow rate can be supplied to the fill level measuring device, a signal processing unit, which, from a measurement signal and the instantaneous change in fill level and/or the instantaneous material flow rate, determines the fill level to be measured.

The invention resides further in a method for fill level measurement with an arrangement for fill level measurement having a fill level measuring device arranged on the container and operating according to the travel time principle, an apparatus for registering a filling and/or emptying of the container, and an auxiliary unit, which by means of the filling and/or emptying registered by the apparatus, determines an instantaneous change in fill level or an instantaneous material flow rate, and in which method a send-signal is transmitted to the fill substance, the echo-signal of the send-signal is received, at least one echo of the echo-signal is determined, a provisional fill level is determined from the travel of time of this, respectively these, echoes, a measured change in fill level is determined from the provisional fill level and at least one more fill level measured in a previous measuring cycle, a deviation between the measured change in fill level and the instantaneous change in fill level is determined and when the deviation exceeds a predetermined upper limit, at least one other echo is determined as probably the echo reflected on the upper surface of the fill substance, and this method is repeated until an echo is found for which the deviation lies below the predetermined upper limit, and the provisional fill level corresponding to this echo is then accepted as the measured fill level, or until a terminating condition occurs.

In accordance with a further development of the method, in the case that the terminating condition occurs, then a safety mode is assumed, or in the case of a known instantaneous change in fill level, the fill level to be measured is extrapolated from the previously measured fill level and the instantaneous change in fill level, and in the case of an unknown instantaneous change in fill level, the fill level to be measured is set equal to the previously measured fill level.

In accordance with a further development of the method, in each measuring cycle, the echo probably reflected on the upper surface of the fill substance is sought within a window, with the position of the window being given by the travel time corresponding to the previously measured fill level.

In accordance with a further development of the method, in the case that within the window no echo leading to a measured fill level can be found, then for a known instantaneous change in fill level, the fill level to be measured is extrapolated from the previously measured fill level and the instantaneous change in fill level, and for an unknown instantaneous change in fill level, the fill level to be measured is set equal to the previously measured fill level.

In accordance with a further development of the last-mentioned method, the window has a predetermined breadth, when the previously determined fill level was found using an echo, a breadth enlarged by a factor allowing for increased uncertainty, when the previously determined fill level was found using extrapolation, a size, for which the fill level to be measured in the next measuring cycle will also then lie in the window, when the fill level changes at a maximum velocity predetermined by the arrangement, when the fill level to be measured previously was set equal to the preceding current fill level.

The invention and further advantages will now be explained in greater detail on the basis of the three examples of embodiments illustrated in the drawings, whose figures show as follows (in the drawings, equal elements are shown using equal reference characters).

BRIEF DESCRIPTION OF THE DRAWINGS

DESCRIPTION OF THE PREFERRED EMBODIMENTS

Figure 1:
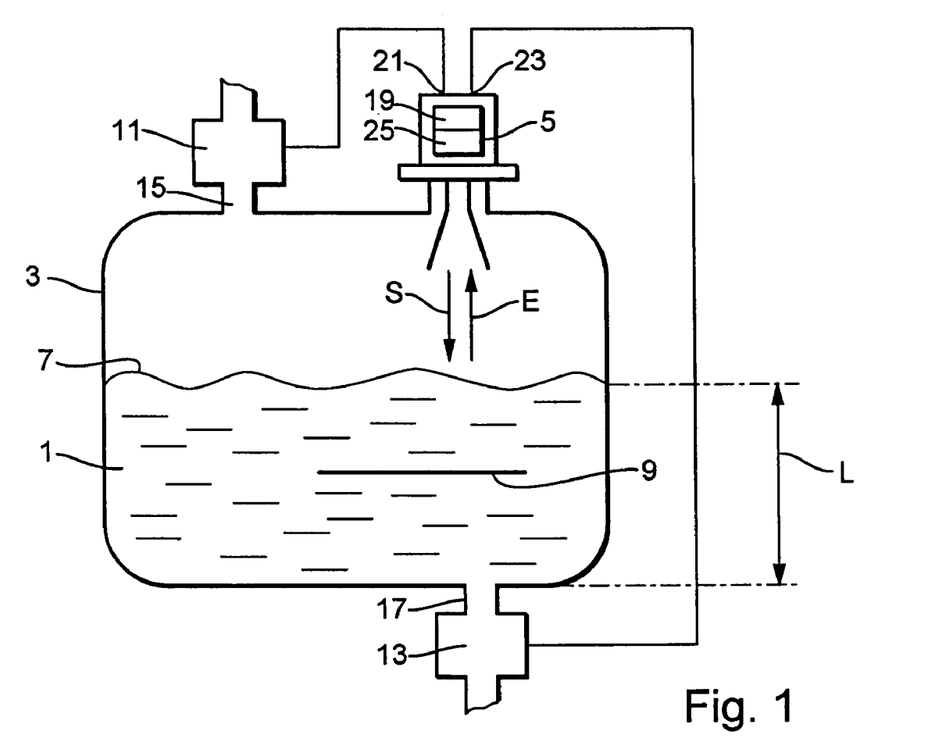
FIG. 1 an arrangement for fill level measurement with a fill level measuring device having two signal inputs and an integrated auxiliary unit.

FIG. 1 shows an arrangement for fill level measurement. A container 3 containing a fill substance 1 is illustrated. A fill level measuring device 5 operating according to the travel time principle is arranged on the container 3. Suitable as the fill level measuring device is e.g. a device operating with microwaves or one operating with ultrasound. The fill level measuring device 5 serves to measure a fill level 7 of the fill substance 1 in the container. In the container 3 a disturbance 9 is schematically drawn in. Disturbances 9 are e.g. fixtures in the container 3, agitators, and naturally any other structure which can cause reflections.

In fill level measurement based on the travel time principle, send-signals S are periodically issued in the direction of a fill substance 1. Echo-signals E of the send-signals S are recorded, and from this an echo-function representing an echo-amplitude A of the echo-signal E as a function of travel time t is formed.

In accordance with the invention, an apparatus for registering a filling 11 and/or an emptying 13 of the container 3 is additionally provided at the container 3.

The apparatus 11 for registering the filling is arranged on the top of the container 3 at a fill nozzle 15 of the container 3. The apparatus 13 for registering the emptying of the container 3 is, in the illustrated embodiment, arranged below the container 3 at a container outlet 17.

Suitable as the apparatuses 11, 13 for registering the filling and/or emptying of the container 3 are devices which register a make the material flow rate through the fill nozzle 15 or through the outlet 17 registerable, e.g. flow rate measuring devices. Flow rate measuring devices offer the advantage that they supply very exact results, from which a change in fill level is then calculable. However, they are also expensive, and therefore not usable in every application.

Alternatively, filling and/or emptying pumps can be used. In the case of filling or emptying pumps, the material flow rate can be roughly determined from information about whether the pumps are operating or not. If the filling, respectively emptying, pump is active, then the fill level rises, respectively falls; if it is turned off, then the fill level remains static. If, in addition, the delivery rate of the filling or emptying pump is known or derivable, then from it a filling or emptying rate is determined, from which, in turn, the material flow rate can be found.

In the same manner, conveyors can also be used, e.g. worm conveyors, trough chain conveyors, conveyor belts, blowers for pneumatic conveyance, or automatically operated valves. In this case also, the material flow rate can be roughly determined. If the conveyor is operating, then the fill level rises, respectively falls; if the conveyor is turned off, then the fill level remains static. If, in addition, the delivery rate of the conveyor is known or derivable, then naturally the material flow rate can be determined more precisely.

The delivery rate of many conveyors is controlled by frequency converters, which are connected to three-phase alternating current motors. In these cases, the frequency of the converter can be used as a measure of the delivery rate for determining the material flow rate more precisely.

An auxiliary unit 19 is provided, which, by means of the filling and/or emptying registered by the apparatus 11, 13, determines an instantaneous material flow rate or an instantaneous change in fill level $V_L$, and makes such available to the fill level measuring device 5 for determining the fill level to be measured L. From an instantaneous fill level and a shape of the container, which is normally available in the form of a container characteristic curve, the instantaneous change in fill level results directly from the instantaneous material flow rate. The latter can be determined by means of either the auxiliary unit 19 or the fill level measuring device 5. In most applications, the instantaneous change in fill level is advantageously left to be determined by the fill level measuring device, because the container characteristic curve is normally available anyway in the fill level measuring device 5.

In the example of an embodiment illustrated in FIG. 1, the auxiliary unit 19 is integrated within the fill level measuring device 5. The integrated auxiliary unit 19 can be an independent physical unit; however, it can also be available in the form of a software module stored in the fill level device 5 and utilized in the computation unit of the device 5.

The fill level measuring device 5 has at least one signal-input 21, 23, over which external information concerning the change in fill level $V_L$ or the material flow rate can be supplied to the fill level measuring device 5. In the embodiment of FIG. 1, two signal-inputs 21, 23 are provided. The apparatus 11 for registering the filling is connected to the fill level measuring device 5 via the signal input 21 and the apparatus 13 for registering the emptying is connected to the fill level measuring device 5 via the signal input 23. If the apparatuses 11, 13 for registering the filling and/or emptying are flow rate measuring devices, then the external information is the measured material flow rates. If filling- or emptying-pumps or conveyors are utilized, then the external information concerns the condition of these apparatuses, such as e.g. the apparatus is operating, the apparatus is turned off, or a signal corresponding to a delivery rate of a pump or conveyor. From this external information, the auxiliary unit 19 determines the change in fill level $V_L$ or the material flow rate. Thus, a material flow rate is derived from the external information, from which the change in fill level $V_L$ is calculated, taking into account the geometry of the container 3 stored in the fill level measuring device or in the auxiliary unit 19, and a fill level measured in a previous measuring cycle. The calculation can be accomplished by the fill level measuring device 5 or the auxiliary unit 19.

At an initial operation of the arrangement, naturally no fill level measured in a previous measuring cycle is available. Instead, in this case, a fill level previously ascertained by other means, e.g. using plumbs, can be supplied.

Alternatively, an initialization mode can be assumed first, in which the fill level is measured with the fill level measuring device in the conventional way. A start value for the fill level determined in this way is stored in the fill level measuring device 5 and is available in the subsequent measuring cycle as fill level.

The fill level measuring device 5 has a signal processing unit 25, which in each measuring cycle determines the fill level to be measured, this being done on the basis of a measurement signal and the change in fill level $V_L$ provided by the auxiliary unit 19 or the fill level measuring device 5.

Figure 2:
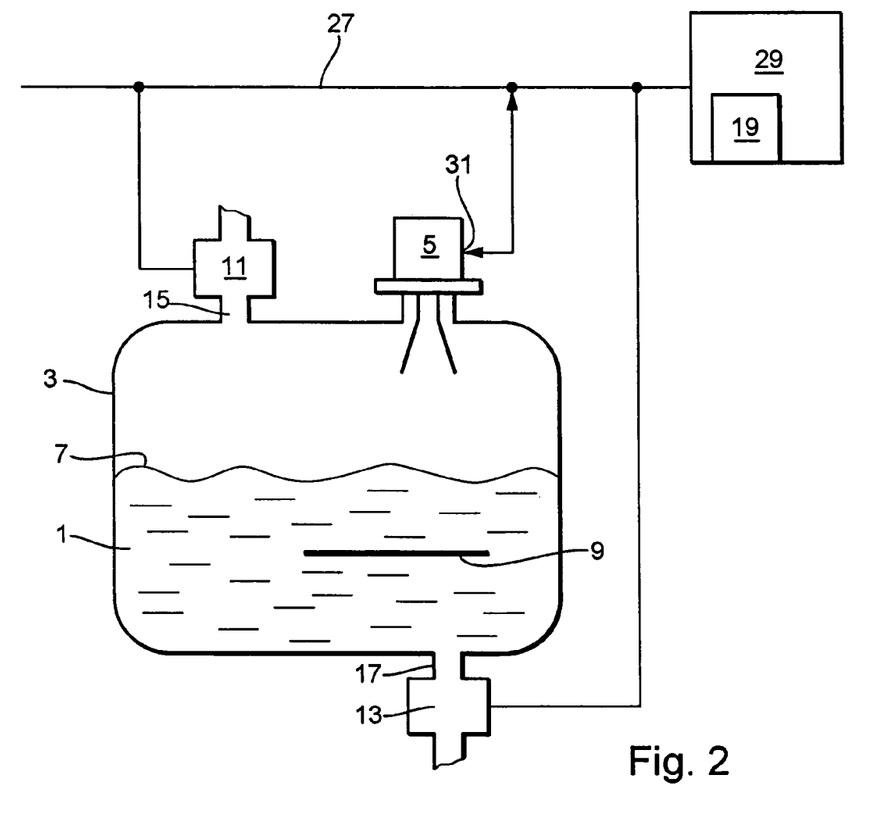
FIG. 2 an arrangement with a fill level measuring device connected to a bus.
Figure 3:
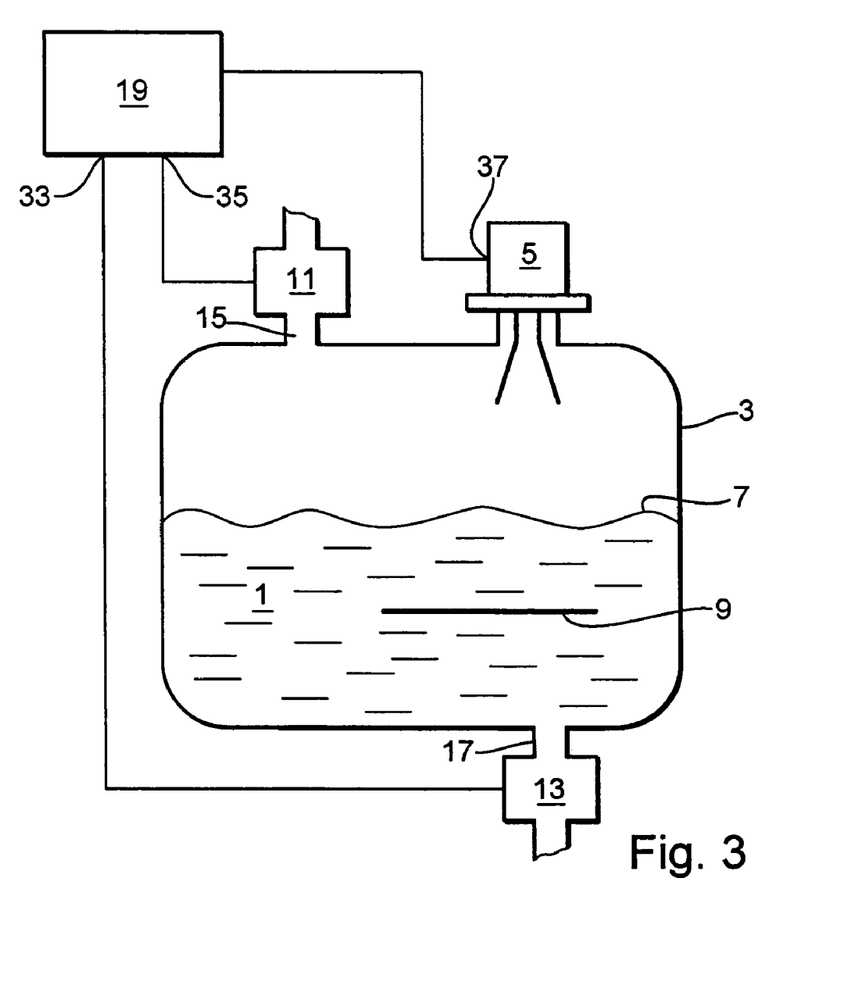
FIG. 3 an arrangement with a fill level measuring device having one signal input, over which an auxiliary unit is connected.

FIGS. 2 and 3 show two further examples of embodiments for arrangements of the invention for fill level measurement. Because of the great similarity to the previously described example, only the differences will be explained in greater detail.

In the example of an embodiment illustrated in FIG. 2, both the fill level measuring device 5 and the apparatuses 11, 13 for registering the filling, respectively emptying, are connected via a bus 27 to a superordinated unit 29, e.g. a process control system or a programmable logic controller.

Superordinated units are frequently provided anyway, especially in large installations, and for this invention, offer the advantage that no additional wiring work is needed. The fill level measuring device 5 and apparatuses for filling or emptying the container 3, e.g. pumps or conveyors, are usually provided anyway in such installations, and are connected via the bus 27 to the superordinated unit 29. These apparatuses can be used at the same time without additional expenditure as apparatuses 11, 13 for registering the filling and/or emptying of the container 3, in that information concerning the operating mode (conveyor operating/not operating, delivery rate of pump, delivery rate of conveyor, or the like), as a rule, usually available anyway in the superordinated unit 29, is fed to the auxiliary unit 19. The auxiliary unit 19 can be located in the superordinated unit 29, as illustrated in FIG. 2. Alternatively, the auxiliary unit 19 naturally can be located in the fill level measuring device 5, same as in the example of an embodiment illustrated in FIG. 1, and can be fed via the superordinated unit 29 and the bus 27.

The fill level measuring device 5 has a single signal-input 31, over which it receives from the superordinated unit 29 the external information concerning the material flow rate or the change in fill level $V_L$. Preferably, through this connection to the superordinated unit 29, the linking of the fill level measuring device 5 to the superordinated unit 29 is accomplished such that measurement results of the fill level measuring device 5, status information, error reports, and similar information are exchangeable over this one connection. Suitable for this are all bidirectional bus protocols.

FIG. 3 shows a further example of an embodiment of an arrangement for the invention. The only difference from the example of an embodiment illustrated in FIG. 1 is that the auxiliary unit 19 is an independent unit. It is not integrated in the fill level measuring device 5, as illustrated in FIG. 1; rather, it is arranged separately.

The auxiliary unit 19 is directly connected to the apparatuses 11, 13 for registering the filling and/or emptying of the container 3, and for this reason has a corresponding number of signal-inputs 33, 35. In this case, the fill level measuring device 5 needs only a single signal-input 37, over which the auxiliary unit 19 makes available to the fill level measuring device 5 the material flow rate or change in fill level.

Figure 4:
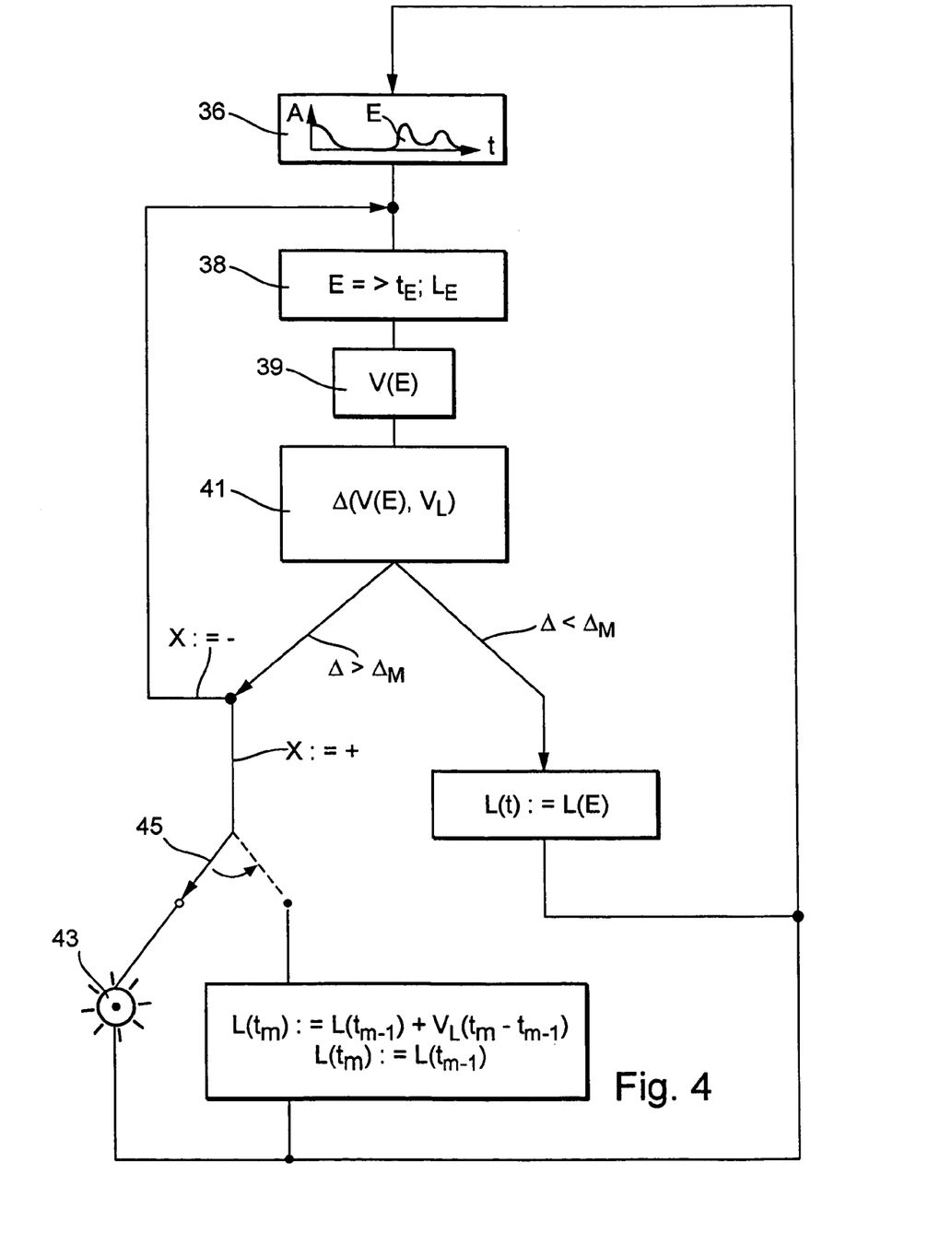
FIG. 4 a flow diagram for a method of the invention for fill level measurement.

The previously described arrangements of the invention for fill level measurement are operated with a method for fill level measurement, which is schematically illustrated in a flow diagram in FIG. 4.

A send-signal, e.g. a short microwave pulse in the case of Pulse-Radar fill level measuring devices, is transmitted from the fill level measuring device 5 to the fill substance, and its echo signal is received. The method will now be explained considering as an example the Pulse-Radar method. However, it is also analogously applicable in the case of other measuring methods based on the travel time principle.

As schematically illustrated In FIG. 4 in box 36, an echo-function representing echo-amplitude A as a function of travel time t is formed. Each value of this echo function corresponds to the amplitude of an echo originating at a specific separation from the antenna. Because the travel time is proportional to the separation of a reflector from the antenna, the echo function indicates the strength of the signal of each echo as a function of the distance of its respective reflector from the antenna.

From the echo function, at least one echo E is determined. For this, all conventional methods for determining echoes can be applied. Thus it can e.g. be assumed, that an echo E resulting from a reflection on the upper surface of the fill substance has a greater amplitude than the remaining echoes. Accordingly, that echo E having the greatest amplitude is then selected. Alternatively, e.g., a probability function can initially be superimposed on the echo function, and from the resulting function an echo E selected, or the first echo E can be selected. The echoes E are selected on the basis that the sought echo reflected on the upper surface of the fill substance is probably to be found among them.

From the travel time $t_E$ of this, respectively these echoes, and with a fixed propagation velocity of the send-signal, a distance between the respective reflectors and the antenna is obtainable. One of the reflectors is, naturally, the upper surface of the fill substance. From the travel time $t_E$ of the echo resulting from a reflection on the upper surface of the fill substance, a provisional fill level $L_E$ is determined. This is illustrated in the flow diagram in box 38.

In a next step 39, a measured change in fill level V(E) is determined from the provisional fill level $L_E$ and at least one further fill level measured in a previous measuring cycle. For this, a difference of the fill level $L_E$ and the fill level L measured in a previous measuring cycle is established, and is divided by the time elapsed between the two measurements. Normally the measurements are taken at constant intervals of time, such that the elapsed time is a constant, which is stored in the fill level measuring device 5. However, the elapsed time can also be variable, and registered e.g. by means of a clock or counter integrated in the fill level measuring device 5.

At an initial operation of the arrangement, naturally no fill level measured in a previous measuring cycle is available. Instead, here a fill level previously ascertained by other means, e.g. using plumbs, can be supplied.

Alternatively, an initialization mode can be assumed first, in which the fill level is measured with the fill level measuring device in the conventional way until a reliable measurement value is available. A start value for the fill level determined in this way is stored in the fill level measuring device 5 and is available in the subsequent measuring cycle as fill level.

The auxiliary unit 19 determines in each measuring cycle an instantaneous change in fill level $V_L$ by means of the information registered by the apparatuses 11, 13 concerning the filling and/or emptying of the container 3.

In the next step 41, a deviation $\Delta(V(E); V_L)$ between the measured change in fill level V(E) and the instantaneous change in fill level $V_L$ is determined.

The deviation $\Delta V(E); V_L)$ is compared with a predetermined upper limit $\Delta_M$. If multiple echoes E were selected previously, then the previously mentioned steps of the method are executed for each individual echo E. Subsequently, that echo E having the smallest deviation $\Delta(V(E); V_L)$ is selected. When the deviation $\Delta(V(E); V_L)$ exceeds the upper limit $\Delta_M$, then the echo function is again referred to, and at least one other echo E' is determined as the echo E probably reflected on the upper surface of the fill substance. For this echo E', the steps 38, 39, and 41 of the method are run through again.

The echo E' can be, for example, that echo of the echo function having the next lowest amplitude. Alternatively, after the first run through, the echo function can be systematically scanned for possible echoes beginning at one end, and in a run through for each echo, the deviation $\Delta(V(E); V_L)$ is reviewed, echo for echo.

This method is repeated until an echo is found for which the deviation $\Delta(V(E); V_L)$ lies below the predetermined upper limit $\Delta_M$, or until a terminating condition occurs. The occurrence of the terminating condition is symbolically represented in FIG. 4 by X:=+, its non-occurrence by X:=−.

If, in the first run-through, all echoes were already selected, then this second run-through naturally does not apply.

If by using the method an echo E is found, for which the deviation $\Delta(V(E); V_L)$ lies below the predetermined upper limit $\Delta_M$, then the provisional fill level $L_E$ corresponding to this echo E is accepted as the measured fill level L, and it is stored for a subsequent measuring cycle. In the subsequent measuring cycle, the measured fill level L stands for the fill level measured in a previous measuring cycle.

Suitable as terminating conditions X are various criteria, depending on the application. These can be available, for example, as user-selectable options in the form of a program module in the signal processing unit, or in suitable memories at another location in the fill level measuring device 5.

One example of a terminating condition X is a predetermined number of run-throughs n. If, after this number of run-throughs, no echo E with a suitable travel time is found, then the terminating condition X occurs. Alternatively, the method can be continued until a run-through is completed for each echo of the echo function.

In the case that the terminating condition X does occur, i.e. the situation is X:=+, then a safety mode 43 can be assumed. In the safety mode 43, the fill level measuring device 5 reports an error and/or reports a safety-related predetermined fill level. The latter is selected such that a possibly present risk of accident, e.g. an overfilling of the container 3, or a running of pumps empty, or the like, is ruled out.

Alternatively, when the instantaneous change in fill level $V_L$ is known, the fill level L to be measured can be extrapolated from the previously measured fill level and the instantaneous change in fill level V(L). This is can be done according to the formula $$L(t_m):=L(t_{m-1})+V_L*(t_m-t_{m-1})$$

with the symbols being defined as follows
$L(t_m)$ the fill level to be measured
$V_L$ the instantaneous change in fill level
$t_m$ the time of the current measurement
$t_{m-1}$ the time of the previous measurement, and
$t_m-t_{m-1}$ the time span between both of the measuring cycles.

If the instantaneous change in fill level $V_L$ is unknown, then the fill level L to be measured can be set equal to the previously measured fill level.

Preferably, there is an opportunity to select, as is indicated in FIG. 4 by the switch 45. Here, the user can, e.g. by the appropriate program selection at the initial start-up, select whether the fill level measuring device 5 will assume the safety mode, or whether it will determine an approximate fill level by extrapolating or equating.

At the end of each completed measuring cycle, the fill level L to be measured is stored as measured fill level for the next measuring cycle. Additionally, the fill level measuring device 5 makes the measured fill level available for processing, evaluation, and/or display.

If in the course of a measuring cycle the safety mode 43 is assumed and no approximate fill level is determined, then, preferably, an alarm signal is issued from the fill level measuring device 5. Additionally, the fill level measured in a previous measuring cycle is stored as measured fill level, so that in the next measuring cycle a fill level measured in a previous measuring cycle is available.

In the method, as it is described by the flow diagram in FIG. 4, windows can additionally be defined and applied. In the case of the Pulse-Radar method these windows are time-windows, in the case of the Frequency Modulated Continuous Wave method they would be frequency ranges.

A window is a section on the echo function where the echo probably reflected on the upper surface of the fill substance is sought. A position of the window is given preferably by the travel time corresponding to the previously measured fill level. For this, the window is preferably specified such that the travel time corresponding to the previously measured fill level lies in the middle of the window.

The method is executed entirely analogously to the method described by the flow diagram in FIG. 4, with, however, the echo E always being sought only within the currently valid window. Echoes lying outside of the window are not taken into consideration. If no suitable echo is found within the window, then this is evaluated as the occurrence of a terminating condition.

If within the window no echo E leading to a measured fill level L is found, then, preferably selectively, the safety mode 43 is assumed, or, in the case of a known instantaneous change in fill level $V_L$, the fill level to be measured is extrapolated from the previously measured fill level and the instantaneous change in fill level, or in the case of an unknown instantaneous change in fill level, the fill level to be measured is set equal to previously measured fill level.

The windows have a breadth, in which, under normal measuring conditions, it is assumed that, in the next measuring cycle, the echo expected from the reflection on the upper surface of the fill substance will surely lie within the window. For this, the breadth of the window is calculated or estimated e.g. from a maximum possible change in fill level. This breadth is stored in the device as predetermined breadth.

If during measuring operations the previously determined fill level was found using an echo pulse, then the breadth of the window for the next measuring cycle is set equal to the predetermined breadth.

However, if the previously determined fill level could not be found using an echo, then an additional measuring uncertainty exists, which must be taken into consideration in the selection of the breadth of the window for following measuring cycle.

If the previously determined fill level was found by extrapolation, then, preferably, a window is selected having a breadth enlarged by a factor allowing for increased uncertainty.

If the measured fill level was set equal to the preceding current fill level, then, preferably, a window is selected having a size at which the fill level to be measured in the next measuring cycle will then also still lie in the window, when the fill level changes at a maximum velocity predetermined by the arrangement.

Windows offer the advantage that only a section of the echo function lying within the window must be recorded and evaluated. This saves time and computing power.

By means of the apparatuses 11, 13 for registering a filling and/or emptying of the container 3 and the auxiliary unit 19, the instantaneous change in fill level is made available to the fill level measuring device 5.

The knowledge of the instantaneous change in fill level facilitates the finding of the fill level. If the echo E cannot be clearly identified by measuring the fill level, then, on the basis of the available instantaneous change in fill level, the correct echo E can be selected from the possible echoes in that, as described above, a comparison of the instantaneous change in fill level with the measured change in fill level resulting for each echo is carried out.

If the correct echo E reaches into the range of an interference echo, from which it can no longer be distinguished, then, during this time, the fill level can continue to be calculated approximately correctly and issued on the basis of the instantaneous change in fill level.

If a window is used, then the position of the window is defined by the previously measured fill level. Here, the increased safety achieved through the involvement of the instantaneous change in fill level in determining the measured fill level offers the advantage of ensuring that the echo E will always lie within the window.

The invention claimed is:

1. A method for fill level measurement with an arrangement for fill level measurement having a fill level measuring device arranged on the container, and operating according to the travel time principle, a material flow apparatus for registering or recording a filling and/or emptying of the container, and an auxiliary unit, which by means of the filling and/or emptying registered or recorded by said material flow apparatus determines the instantaneous change in fill level ($V_L$) or the instantaneous material flow rate, the method comprising the steps of:

transmitting a send-signal (S) to the fill substance;
receiving the echo-signal (E) of the send-signal;
determining at least one echo (E) of the echo-signal (E);
determining a provisional fill level ($L_E$) from the travel time ($t_E$) of this, respectively these, echoes (E);

determining a measured change (V(E)) in the fill level from the provisional fill level ($L_E$) and at least one other fill level (L) measured in a previous measuring cycle;

determining a deviation ($\Delta$(V(E); $V_L$)) between the measured change in fill level (V(E)) and the instantaneous change in fill level ($V_L$);

determining at least one other echo (E') as probably the echo (E') reflected on the upper surface of the fill substance when the deviation ($\Delta$(V(E); $V_L$)) exceeds a predetermined upper limit ($\Delta_M$); and repeating said last determination until an echo (E) is found for which the deviation ($\Delta$(V(E); $V_L$)) lies below the predetermined upper limit ($\Delta_M$), and the provisional fill level ($L_E$) corresponding to this echo (E) is then accepted as the measured fill level (L), or until a terminating condition (X) occurs.

2. The method as claimed in claim 1, wherein:

for the case that a terminating condition (X) occurs, one of the following results: a safety mode (43) is assumed, and in the case of a known instantaneous change in fill level ($V_L$), the fill level to be measured is extrapolated from the previously measured fill level (L) and the instantaneous change in fill level ($V_L$), and in the case of an unknown instantaneous change in fill level ($V_L$), the fill level to be measured is set equal to the previously measured fill level (L).

3. The method as claimed in claim 1, wherein:

in each measuring cycle the echo probably reflected on the upper surface of the fill level is sought within a window, and the position of the window is given by the travel time corresponding to the previously measured fill level (L).

4. The method as claimed in claim 3, wherein:

for the case that no echo (E) leading to a measured fill level (L) can be found within the window, in the case of a known instantaneous change in fill level ($V_L$), the fill level to be measured is extrapolated from the previously measured fill level (L) and the instantaneous change in fill level ($V_L$), and in the case of an unknown instantaneous change in fill level ($V_L$), the fill level to be measured is set equal to the previously measured fill level (L).

5. The method as claimed in claim 4, wherein:

the window has one of the following: a predetermined breadth when the previously determined fill level (L) was found using an echo, a breadth enlarged by a factor allowing for increased uncertainty when the previously determined fill level (L) was found using extrapolation, and a size at which the fill level to be measured in the next measuring cycle will then also still lie in the window, when the fill level changes at a maximum velocity predetermined by the arrangement, if the fill level to be measured previously was set equal to the preceding current fill level.

* * * * *